United States Patent [19]

Berner

[11] Patent Number: 4,593,472
[45] Date of Patent: Jun. 10, 1986

[54] LENGTH OR ANGLE MEASURING INSTRUMENT

[75] Inventor: Eckhard Berner, Monchen-Gladbach, Fed. Rep. of Germany

[73] Assignee: Dr. Johannes Heidenhain GmbH, Traunreut, Fed. Rep. of Germany

[21] Appl. No.: 640,779

[22] Filed: Aug. 14, 1984

[30] Foreign Application Priority Data

Sep. 24, 1983 [DE] Fed. Rep. of Germany ....... 3334609

[51] Int. Cl.⁴ .............................................. G01B 11/04
[52] U.S. Cl. .................................................. 33/125 C
[58] Field of Search ............. 33/125 R, 125 A, 125 C, 33/125 T; 250/237 G

[56] References Cited

U.S. PATENT DOCUMENTS

| | | | |
|---|---|---|---|
| 3,815,125 | 6/1974 | May et al. | 250/237 G |
| 4,184,262 | 1/1980 | Kolb et al. | 33/125 C |
| 4,189,840 | 2/1980 | Holstein | 33/125 C |
| 4,198,757 | 4/1980 | Nelle et al. | 33/125 C |

FOREIGN PATENT DOCUMENTS 2706926 6/1979 Fed. Rep. of Germany .
18524 8/1969 Japan ................................ 33/125 C

OTHER PUBLICATIONS

Die Numerische Steuerung von Werkzeugmaschinen by Prof. Dr.-Ing. Wilhelm Simon, p. 7, Carl Hanser Verlag Munchen 1971.

Primary Examiner—Richard R. Stearns
Attorney, Agent, or Firm—Willian Brinks Olds Hofer Gilson & Lione Ltd.

[57] ABSTRACT

In this position measuring instrument switches or cams of a limit position switching system are integrated as components of the carrier body for the measuring graduation. The switches or cams mounted to the carrier body cooperate with corresponding parts on a machine and form with these parts limit position switching systems. By integrating the limit position switch components with the measuring instrument the functioning of the position measuring instrument is extended beyond the pure measuring function.

9 Claims, 3 Drawing Figures

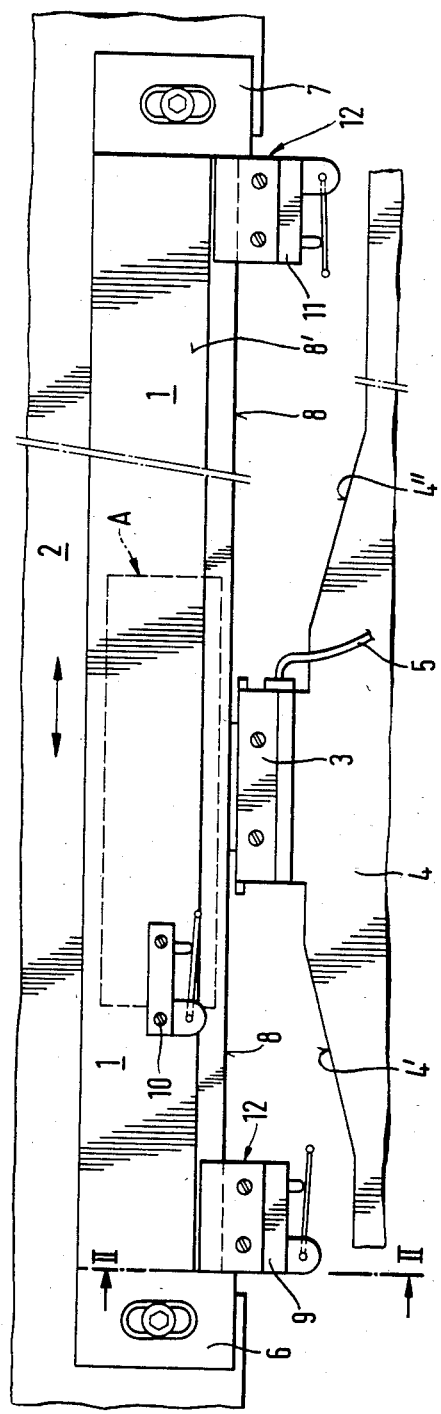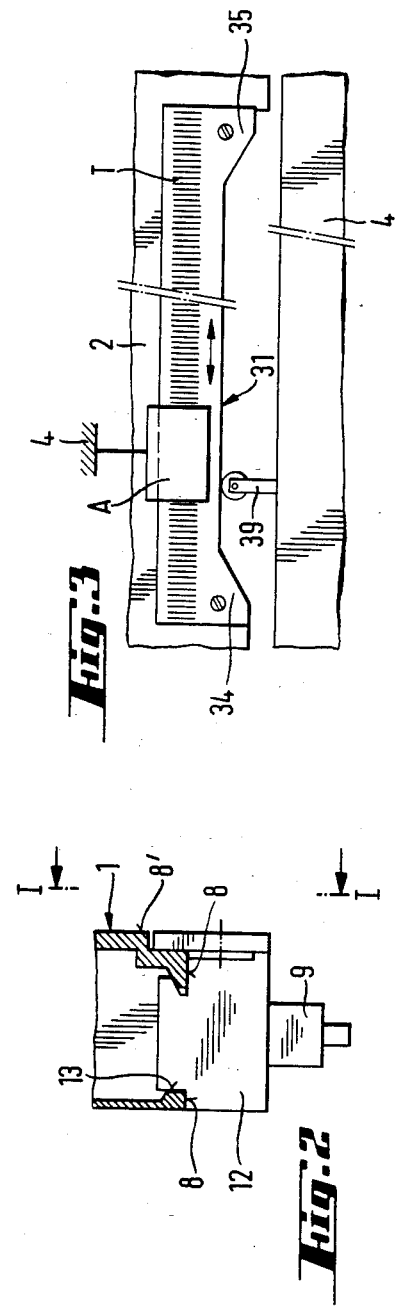

LENGTH OR ANGLE MEASURING INSTRUMENT

BACKGROUND OF THE INVENTION

The present invention relates to a length or angle measuring instrument for measuring the relative position of first and second objects movable relative to one another, of the type comprising a measuring scale or graduation carrier adapted to be mounted to the first object, and a scanning unit adapted to be mounted to the second object.

It is a generally known practice to provide machine tools with so-called limit position switches, which are actuated by cams fastened to the slide piece of the machine tool. As suggested by the name limit position switch, when the slide piece reaches a limit position the switch is controlled to generate a limit position signal. In general, this signal is used as an emergency off signal for the machine tool. When the cam and the follower of the switch come into contact at a predetermined limit position, the switch is activated. See for example the discussion in Simon, "Die numerische Steuerung von Werkzeugmaschinen" page 7, 1971 Edition. Because the moving machine parts have a relatively large mass and a over-run on the machine tool commonly results, it is also common practice to provide preliminary switching points at which the speed of the machine slide piece is reduced. These preliminary switching point switches are likewise arranged to be actuated by cams.

In prior art devices in which limit switches and cams are mounted to the machine tool itself, precisely processed assembling surfaces must be provided on the machine tool. Such precisely processed assembling surfaces require space on the machine tool and increase the cost of the machine tool.

SUMMARY OF THE INVENTION

The present invention is directed to a novel attachment of such limit switch arrangements, which both increases the versatility of the measuring instrument and reduces the space requirements of the limit switch arrangement.

According to this invention, a position measuring instrument of the type described initially above is provided with at least one limit position switch, at least one cam adapted to switch the limit position switch, means for arranging one of the switch and the cam on the carrier to move with the first object, and means for arranging the other of the switch and the cam to move with the second object such that the cam and switch are aligned to cause the cam to activate the switch at a selected relative position between the first and second objects.

The present invention provides important advantages in that no separate assembling surfaces must be provided for the limit position switches and/or the cams. Furthermore, in the preferred embodiments described below the position of the limit position switching arrangement can be varied in a simple, straightforward manner. By combining the measuring instrument with portions of the limit position switching system, the manufacturing costs of the measuring instrument are increased to a much smaller degree than is necessary in the typical case in which limit position switches and cams are mounted to the machine tool.

The invention itself, together with further objects and attendant advantages, will best be understood by reference to the following detailed description, taken in conjunction with the accompanying drawings.

BRIEF DESCRIPTION OF THE DRAWINGS

FIG. 1 is a schematic view of an encapsulated length measuring instrument which includes a first preferred embodiment of this invention.

FIG. 2 is a partial cross-sectional view taken along line 2—2 of FIG. 1.

FIG. 3 is a schematic view of a non-enclosed length measuring instrument which includes a second preferred embodiment of this invention.

DETAILED DESCRIPTION OF THE PRESENTLY PREFERRED EMBODIMENTS

Turning now to the drawings, FIG. 1 shows a length measuring instrument 1 which is mounted to a slide piece 2 of a machine tool (not shown in detail). The length measuring system 1 includes a measuring graduation (not shown) mounted in the interior of a housing 8. This measuring graduation is photoelectrically scanned in a known manner by a scanning unit A. The scanning unit A is mounted by means of a mounting foot 3 to the bed 4 of the machine tool. The bed 4 of the machine tool defines two spaced switching cams 4', 4". During relative movement between the machine bed 4 and the slide piece 2, the measuring graduation is shifted with respect to the scanning unit A and measuring signals are generated which are applied via a cable 5 to an evaluating-/display unit (not shown). Often, the evaluating/display unit is constructed in modern machines as a numerical control which generates control commands for the machine in accordance with a stored program and the measured position values generated by the measuring instrument 1.

For construction reasons caused in part by measuring technology, the scanning unit A is in general considerably longer than the mounting foot 3 (see West German Patent DE-PS No. 27 06 926). For this reason, the entire length of the measuring graduation is in general not available for use as the measuring length, since the scanning unit A in its end position comes against the end pieces 6, 7 of the housing 8 of the measuring instrument 1 when the end parts of the mounting foot 3 are still spaced from the end pieces 6, 7. In the past, this spacing was not effectively utilized to make the measuring instrument more versatile. According to this invention, in this embodiment limit position switches as 9, 10, 11 are mounted directly on the measuring instrument 1.

Since the surfaces of the housing 8 of the measuring instrument 1 are in any case precisely tooled, no additional expenditure is necessary to mount the limit position switches 9, 10, 11 to the housing 8 as shown in FIG. 1. The measuring instrument 1 can be especially advantageously formed if the limit position switches 9, 10, 11 are mounted slideably and clampably in place to the housing 8. In this event, the limit position switches 9, 10, 11 can be adjusted in a particularly simple manner in order to make it possible to take into account the physical conditions of individual instruments and machine tools in a remarkably simple manner during assembly. Furthermore, preliminary switching points can be arranged in a virtually arbitrary manner in the event the limit position switches 9, 10, 11 are spaced from one another along the measuring direction (indicated by the double headed arrow of FIG. 1) on the various surfaces 8' of the housing 8.

In the first preferred embodiment of FIGS. 1 and 2 a preliminary switch 10 is arranged on the surface 8' of the housing 8, and this preliminary switch 10 is actuated by a projecting arm (not shown) which is mounted on the machine bed 4. After actuation of the preliminary switch 10, the speed of the slide piece 2 is reduced to such an extent that the slide piece 2 comes to a standstill in proper time after actuation of the limit position switch 9 by the cam 4'.

In a similar manner one or more preliminary switches 10 can be mounted on the measuring instrument 1. In each case, the mounting and positioning of such additional preliminary switches is governed according to the requirements of the machine tool to interact with corresponding switching cams 4', 4".

FIG. 2 shows a partial sectional view taken along line 2—2. As shown in FIG. 2 the limit position switch 9 is fastened to a mounting element 12 which is clamped fast in a longitudinal slit 13 defined by the housing 8. Ordinarily, length measuring instruments of the type shown in FIG. 1 are provided with a longitudinal slit which runs in the measuring direction and allows the mounting foot 3 to extend into the housing and to couple the scanning unit A with the bed 4. The particular details of the clamp fastening arrangement can readily be designed by a skilled worker in the field in correspondence with the requirements of a particular application.

FIG. 3 shows a schematic view of a second preferred embodiment of this invention as adapted for use with an open measuring instrument in which a measuring graduation T is arranged directly on a carrier body 31. This carrier body 31 also defines switching cams 34, 35 for a limit position switch 39 which is mounted onto the machine bed 4. A scanning unit A is also rigidly connected with the machine bed 4. This schematic drawing of the second preferred embodiment is provided to show the manner in which the present invention can be adapted according to the discretion of a skilled worker in the field to mount at will either the limit position switches or the corresponding cams on the measuring instrument 1 and to provide in each case the other part of the switching arrangement on the machine.

Of course, it is intended that the foregoing detailed description be regarded as illustrative rather than limiting, and that it be understood that it is the following claims, including all equivalents, which are intended to define the scope of this invention.

I claim:

1. In a position measuring instrument for measuring the relative position of first and second portions of a machine movable relatively to one another, of the type comprising a measuring scale or graduation carrier adapted to be mounted to the first portion of the machine, and a scanning unit adapted to be mounted to the second portion of the machine, the improvement comprising:
at least one limit position switch adapted to control the machine to limit relative movement of the first and second portions of the machine;
at least one cam adapted to switch the limit position switch;
means for arranging one of the switch and the cam on the carrier to move with the first portion of the machine; and
means for arranging the other of the switch and the cam to move with the second portion of the machine such that the cam and switch are aligned to cause the cam to actuate the switch at a selected relative position between the first and second portions of the machine.

2. The invention of claim 1 further comprising:
at least one additional limit position switch;
at least one additional cam adapted to switch the additional limit position switch;
means for arranging one of the additional cam and the additional limit position switch on the carrier to move with the first portion of the machine; and
means for arranging the other of the additional cam and the additional limit position switch to move with the second portion of the machine such that the additional cam and the additional switch are aligned.

3. The invention of claim 1 wherein a plurality of cams are arranged on the carrier, spaced from one another along a measuring direction.

4. The invention of claim 1 wherein a plurality of limit position switches are arranged on the carrier, spaced from one another along a measuring direction.

5. The invention of claim 1 wherein the means for arranging one of the switch and the cam on the carrier comprises:
a guideway defined by the carrier to extend along a measuring direction, said guideway shaped to slideably receive said one of the switch and the cam; and
means for clamping said one of the switch and the cam in position in the guideway.

6. The invention of claim 5 wherein the carrier defines an elongated slit extending alongside the measuring scale, wherein the measuring instrument comprises a follower mounted between the scanning unit and the second portion and extending through the slit, and wherein the guideway is at least in part defined by the slit.

7. The invention of claim 1 wherein the means for arranging one of the switch and the cam on the carrier comprises means for defining the cam as a fixed component of the carrier.

8. The invention of claim 1 wherein the limit position switch generates an emergency off signal, and wherein the machine responds to the emergency off signal by halting relative movement between the first and second portions of the machine.

9. In a position measuring instrument for measuring the relative position of first and second portions of a machine tool movable relatively to one another, of the type comprising a housing which is adapted to be mounted to the first portion and defines a slit extending along a measuring direction, a measuring scale mounted within the housing, a scanning unit guided for movement within the housing along the measuring direction, and a follower which is mounted to the scanning unit and extends out of the housing via the slit to couple the scanning unit to the second portion, the improvement comprising:
at least one limit position switch adapted to control the machine to limit relative movement of the first and second portions of the machine;
at least one cam adapted to switch the limit position switch;
means for mounting one of the switch and the cam to the housing to slide along the slit such that the slit acts as a guide for said one of the switch and the cam;
means for clamping said one of the switch and the cam to the housing to secure said one of the switch and the cam in place with respect to the housing and the first portion of the machine; and means for arranging the other of the switch and the cam to move with the second portion of the machine such that the cam and switch are aligned to cause the cam to actuate the switch at a selected relative position between the first and second portions of the machine.

* * * * *